(12) United States Patent
Moriya et al.

(10) Patent No.: US 7,362,528 B2
(45) Date of Patent: Apr. 22, 2008

(54) MAGNETIC RECORDING MEDIUM

(75) Inventors: Makoto Moriya, Tokyo (JP); Takahiro Suwa, Tokyo (JP)

(73) Assignee: TDK Corporation, Tokyo (JP)

( * ) Notice: Subject to any disclaimer, the term of this patent is extended or adjusted under 35 U.S.C. 154(b) by 353 days.

(21) Appl. No.: 10/998,594

(22) Filed: Nov. 30, 2004

(65) Prior Publication Data

US 2005/0117253 A1 Jun. 2, 2005

(30) Foreign Application Priority Data

Dec. 1, 2003 (JP) ............................. 2003-401603

(51) Int. Cl.
*G11B 5/09* (2006.01)

(52) U.S. Cl. ...................................... 360/48

(58) Field of Classification Search ..................... None
See application file for complete search history.

(56) References Cited

U.S. PATENT DOCUMENTS

| | | | |
|---|---|---|---|
| 5,828,536 A * | 10/1998 | Morita | 360/135 |
| 6,088,200 A | 7/2000 | Morita | |
| 2002/0051315 A1 * | 5/2002 | Mundt et al. | 360/135 |

FOREIGN PATENT DOCUMENTS

JP 11-161944 6/1999

OTHER PUBLICATIONS

Hattori et al, Fabrication of Discrete Track Perpendicular Media for High Recording Density, Jul. 2004, IEEE Transactions on Magnetics, vol. 40, No. 4, pp. 2510-2515.*
U.S. Appl. No. 10/923,728, filed Aug. 24, 2004.
English Language Abstract of JP 11-161944.

* cited by examiner

*Primary Examiner*—Andrea Wellington
*Assistant Examiner*—Dan I. Davidson
(74) *Attorney, Agent, or Firm*—Greenblum & Bernstein, P.L.C.

(57) ABSTRACT

A data track area and a servo pattern area are formed on a magnetic recording medium by embedding a nonmagnetic material inside concaves in a plurality of types of convex/concave patterns formed of a magnetic material on a substrate. The servo pattern area includes a plurality of types of first functional areas, in which control signals for disk access are recorded during manufacturing using the convex/concave patterns, and a second functional area, in which a convex/concave pattern of a different type to the convex/concave patterns of the respective first functional areas is formed and in which the nonmagnetic material is embedded so that an average height within the second functional area is substantially equal to an average height in the data track area.

7 Claims, 4 Drawing Sheets

MAGNETIC RECORDING MEDIUM

BACKGROUND OF THE INVENTION

1. Field of the Invention

The present invention relates to a magnetic recording medium on which a data track area and a servo pattern area are formed.

2. Description of the Related Art

Japanese Laid-Open Patent Publication No. H11-161944 discloses a magnetic disk installed in a magnetic disk apparatus as an example of a magnetic recording medium of this type. As shown in FIGS. 7 and 8 of this publication, this magnetic disk has a plurality of types of convex/concave patterns formed on a substrate made of glass or the like, with such convex/concave patterns being covered with a magnetic film. A data zone, in which convexes (lands) and concaves (grooves) for data recording are formed along a direction of travel of a head slider (that is, a circumferential direction), and a servo zone, in which control signals such as servo signals and the like are recorded by convexes and concaves, are formed on the magnetic disk. On this type of magnetic disk, the fly height of the head slider on the magnetic disk is reduced in parts where the area ratio of concaves to convexes is high. Accordingly, on this magnetic disk, convexes and concaves are formed by inverting a convex/concave pattern of a servo zone of a normal magnetic disk (patterned medium) to reduce the area ratio of the concaves to convexes in the servo zone and thereby reduce the fly height. By doing so, compared to a normal magnetic disk, it is possible to suppress the fluctuation in the fly height of the head slider when the head slider passes the data zone and passes the servo zone.

However, the above conventional magnetic disk has the following problem. That is, on the conventional magnetic disk, fluctuation in the fly height of the head slider is suppressed by reducing the area ratio of the concaves to the convexes. For such a disk, the types of convex/concave patterns differ between the data zone and the servo zone. For this reason, it is extremely difficult to make one area ratio of concaves in the data zone to convexes match another area ratio of concaves in the servo zone to convexes by inverting the convex/concave pattern of a servo pattern on a normal magnetic disk. Accordingly, with the conventional magnetic disk where the area ratio of the concaves to the convexes is reduced, there is the problem that it is difficult to considerably reduce the fluctuation in the fly height of the head slider.

Figure 14:
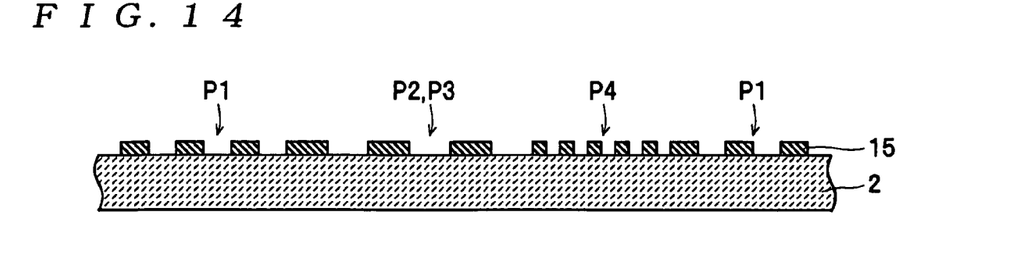
FIG. 14 is a cross-sectional view of a state where a plurality of types of convex/concave patterns are formed on a multilayer structure by a ferromagnetic body.
Figure 15:
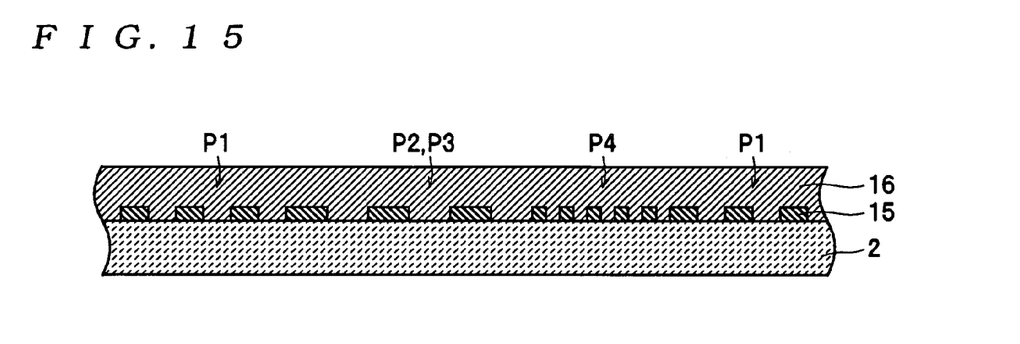
FIG. 15 is a cross-sectional view of a state where a nonmagnetic body has been formed by sputtering so as to cover the respective convex/concave patterns shown in FIG. 14.
Figure 16:
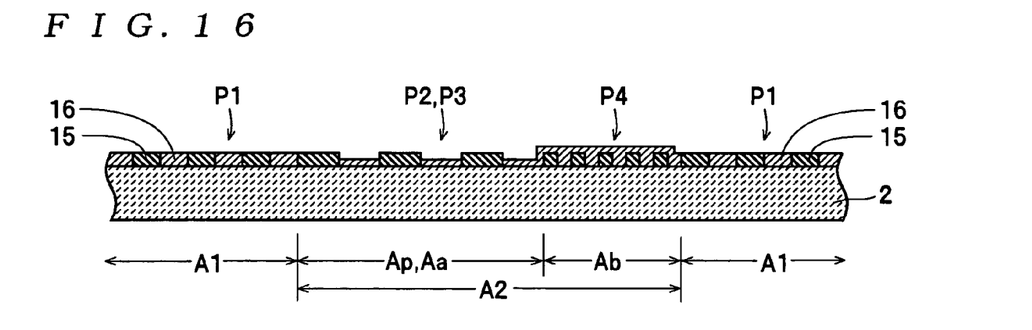
FIG. 16 is a cross-sectional view of a state where the nonmagnetic body shown in FIG. 15 has been etched.

On the other hand, the present inventors have developed a technique that considerably suppresses the amount of fluctuation in the fly height of a head slider by using a construction where the surface of a magnetic disk is flattened by embedding a nonmagnetic body inside the concaves of the data track area (data zone) and the servo pattern area (servo zone) so that concaves are not formed in the surface of a magnetic disk or only extremely shallow concaves are formed. More specifically, as shown in FIG. 14, first, convex/concave patterns P1 to P4 for forming a data track area A1 and a servo pattern area A2 (see FIG. 16) are formed by a ferromagnetic body 15 on a multilayer structure 2 (substrate) in which a glass substrate, a base layer, a soft magnetic layer, an oriented layer, and the like are formed in layers. Next, as shown in FIG. 15, a nonmagnetic body 16 is formed by sputtering so as to cover the convex/concave patterns P1 to P4. After this, as shown in FIG. 16, the nonmagnetic body 16 is etched in the data track area A1 until the surface of the ferromagnetic body 15 is exposed from the nonmagnetic body 16. By doing so, the surface of the magnetic disc is flattened.

Figure 17:
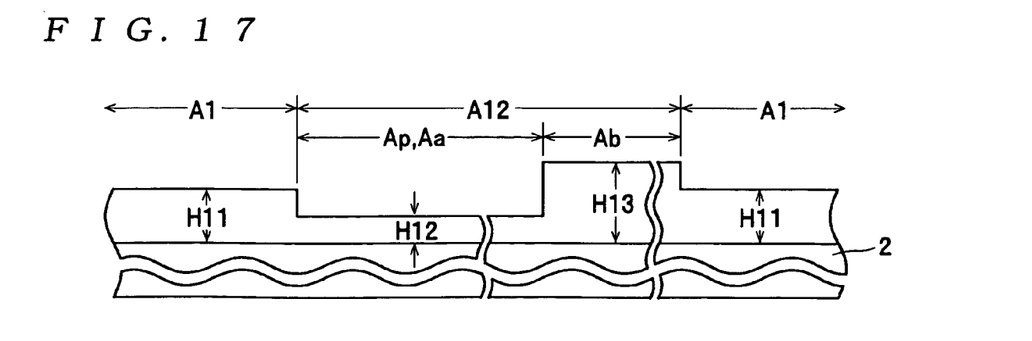
FIG. 17 is a cross-sectional view showing average heights of the respective areas on a magnetic disk developed by the present inventors.

However, by further investigating the above technique they had developed themselves, the present inventors discovered the following problems. That is, in their own technique, as shown in FIG. 16, in parts (such as a preamble area Ap and an address area Aa) of the convex/concave patterns P2, P3 whose formation pitch is larger (i.e., the concaves are wider) than the formation pitch of the convex/concave pattern P1 of the data track area A1, the nonmagnetic body 16 is more easily etched than in the data track area A1, so that the surface of the nonmagnetic body 16 in the convex/concave patterns P2, P3 becomes lower than the surface of the nonmagnetic body 16 inside the convex/concave pattern P1. Therefore, as shown in FIG. 17, an average height H12 from the surface of the multilayer structure 2 in the preamble area Ap and the address area Aa becomes lower than an average height H11 in the data track area A1, resulting in the fly height in the preamble area Ap and the address area Aa being lower than in the data track area A1. Also, as shown in FIG. 16, in parts (such as a burst area Ab) of the convex/concave pattern P4 where the formation pitch is smaller than that of the convex/concave pattern P1 (i.e., the concaves are narrower), the nonmagnetic body 16 is more difficult to etch than in the data track area A1, so that in some cases the nonmagnetic body 16 is left on the convexes of the convex/concave pattern P4. Therefore, as shown in FIG. 17, an average height H13 of the burst area Ab becomes higher than the average height H11 of the data track area A1, resulting in the fly height of the burst area Ab becoming large relative to that of the data track area A1. Accordingly, for a magnetic disk that has the preamble area Ap and the address area Aa, where the fly height is low, and the burst area Ab, where the fly height is high, inside the servo pattern area, there is the problem of increased fluctuation in the fly height per revolution of the magnetic disk. It should be noted that even when only an area where the fly height is low or only an area where the fly height is high is present inside the servo pattern area, there is still the problem of increased fluctuation in the fly height per revolution of the magnetic disk.

The present invention was conceived to solve the problem described above and it is a principal object of the present invention to provide a magnetic recording medium that can considerably suppress fluctuation in the fly height of a head slider.

SUMMARY OF THE INVENTION

On a magnetic recording medium according to the present invention, a data track area and a servo pattern area are formed by embedding a nonmagnetic material inside concaves in a plurality of types of convex/concave patterns formed of a magnetic material on a substrate, the servo pattern area including: a plurality of types of first functional areas in which control signals for disk access are recorded during manufacturing using the convex/concave patterns; and a second functional area, in which a convex/concave pattern of a different type to the convex/concave patterns of the respective first functional areas is formed and in which the nonmagnetic material is embedded so that an average height within the second functional area is substantially equal to an average height in the data track area. It should be noted that as the expression "an average height . . . is substantially equal" means that the difference in height with the average height of the data track area is within a range of around ±10%, for example.

According to this magnetic recording medium, by forming the second functional area in the servo pattern area, compared to a magnetic recording medium on which no second functional area is formed, it is possible to sufficiently reduce the fluctuation in the fly height of a head slider that passes (travels over) the data track area, the servo pattern area, and the data track area in that order. Accordingly, when recording or reproducing data on the magnetic recording medium, it is possible to avoid a situation where the head slider contacts the surface of the magnetic recording medium.

Here, it is possible to construct the servo pattern area so that the second functional area is formed between adjacent first functional areas. With this construction, it is possible to form the second functional area without dividing the respective first functional areas into a plurality of parts. Accordingly, since it is possible to use, as the convex/concave patterns that compose the respective first functional areas, the same types of patterns as the convex/concave patterns corresponding to a normal servo pattern area, there is no need to change the types of convex/concave patterns in order for the second functional area to be formed. As a result, tracking servo control can be carried out without any special servo signal detection function being necessary.

Also, the servo pattern area may be constructed by forming at least an address area and a burst area as the first functional areas and forming the second functional area within at least one area out of the address area and the burst area. With this construction, it is possible to sufficiently suppress the fluctuation in the fly height of the head slider in the same way as the magnetic recording medium described above.

It is also possible to form the second functional area by forming a convex/concave pattern of a same type as the convex/concave pattern formed in the data track area and embedding the nonmagnetic material in the convex/concave pattern in the second functional area. With this construction, a substantially equal average height can be achieved easily and reliably compared to when the second functional layer is constructed with an average height that is substantially equal to the average height of the data track area using a different type of convex/concave pattern to the convex/concave pattern of the data track area.

It should be noted that the disclosure of the present invention relates to a content of Japanese Patent Application 2003-401603 that was filed on 1 Dec. 2003 and the entire content of which is herein incorporated by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Preferred embodiments of a magnetic recording medium according to the present invention will now be described with reference to the attached drawings.

Figure 1:
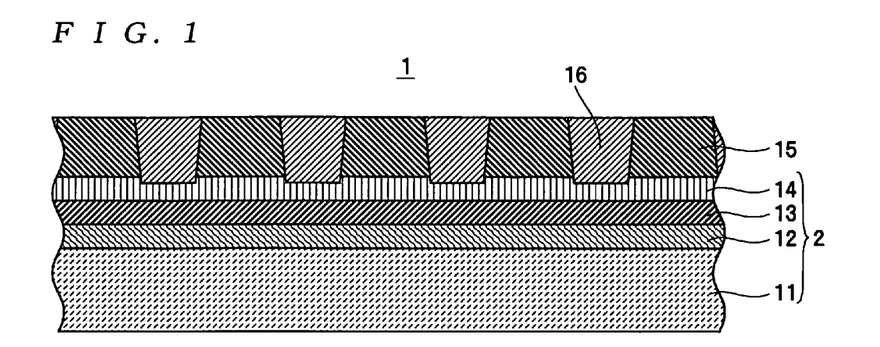
FIG. 1 is a cross-sectional view of a magnetic disk.

A magnetic disk 1 shown in FIG. 1 is one example of a magnetic recording medium according to the present invention, and is provided inside a housing together with a spindle motor, head slider (magnetic head) and the like, neither of which is shown, to construct a magnetic disk apparatus. The magnetic disk 1 is a discrete track-type magnetic recording medium (patterned medium) for vertical recording. Convex/concave patterns P1 to P5 (examples of "various types of convex/concave patterns" for the present invention, see FIG. 2) are formed by a ferromagnetic body 15 (a "ferromagnetic material" for the present invention) on a multilayer structure 2 (one example of a "substrate" for the present invention) where a base layer 12, a soft magnetic layer 13, an oriented layer 14, and the like are laminated in that order on a glass substrate 11. A nonmagnetic body 16 (a "nonmagnetic material" for the present invention) is embedded inside concaves of the convex/concave patterns P1 to P5. It should be noted that in reality, although a protective layer and a lubricating layer are formed so as to cover the ferromagnetic body 15 and the nonmagnetic body 16 of the magnetic disk 1, for ease of understanding the present invention, such layers have been omitted from the drawings and the description.

Figure 2:
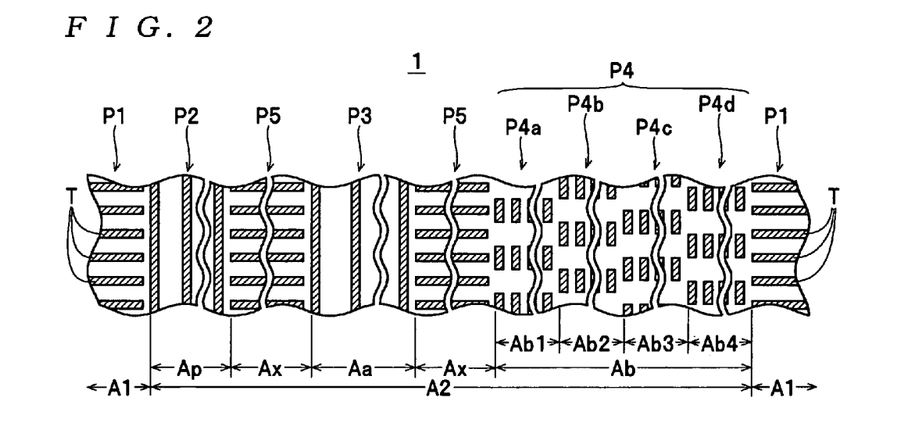
FIG. 2 is a pattern diagram showing example patterns of respective areas on the magnetic disk.

Also, as shown in FIG. 2, a data track area A1 and a servo pattern area A2 are provided on the magnetic disk 1. In the data track area A1, a plurality of data recording tracks T, T, . . . (a convex/concave pattern P1) for recording data are formed in concentric circles along a direction of travel (the left-right direction in FIG. 2) of a head slider. In the servo pattern area A2, various kinds of control signals (control signals for disc access) including servo signals for tracking servo control for the data recording tracks T are formed by convex/concave patterns P2, P3, and P4 (P4a to P4d) during the manufacturing of the magnetic disk 1. Also, a preamble area Ap, an address area Aa, and a burst area Ab (as one example, a first burst area Ab1 to a fourth burst area Ab4) that respectively correspond to "first functional areas" for the present invention are formed in the servo pattern area A2. In addition, between the preamble area Ap and the address area Aa, and between the address area Aa and the first burst area Ab1, a fly height adjusting area Ax corresponding to a "second functional area" for the present invention is formed in the servo pattern area A2.

Figure 3:
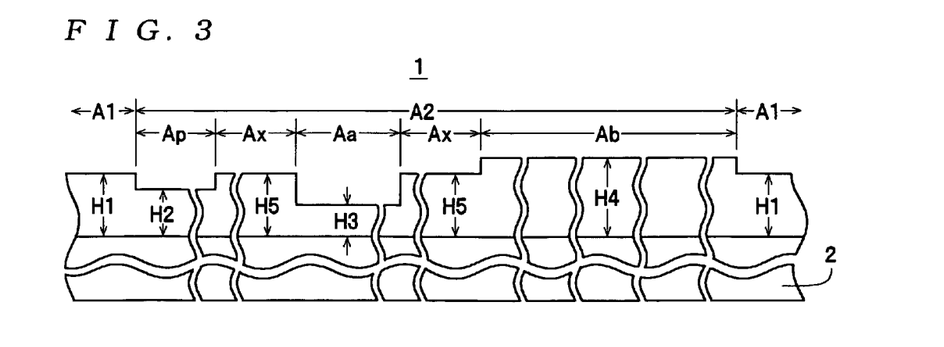
FIG. 3 is a cross-sectional view showing average heights of the respective areas on the magnetic disk.

In this case, in the preamble area Ap, the convex/concave pattern P2 is formed so that a length along the direction of travel of the head slider is 18 μm, for example, with as shown in FIG. 3, this area being formed so that in a state where the nonmagnetic body 16 has been embedded inside the concaves of the convex/concave pattern P2, an average height H2 from the surface of the multilayer structure 2 is around 5 nm lower than an average height H1 of the data track area A1. Also, in the address area Aa, the convex/concave pattern P3 is formed so that a length along the direction of travel is 15 μm, for example, with this area being formed so that in a state where the nonmagnetic body 16 has been embedded, an average height H3 is around 10 nm lower than an average height H1 of the data track area A1. Also, in the first burst area Ab1 to the fourth burst area Ab4 of the burst area Ab, convex/concave patterns P4a to P4d are formed so that a length along the direction of travel is 10 μm, for example, with such areas being formed so that in a state where the nonmagnetic body 16 has been embedded, an average height H4 for all is around 5 nm higher than an average height H1 of the data track area A1. On the other hand, in fly height adjusting areas Ax, convex/concave patterns P5 that are the same type as the convex/concave pattern P1 (that is, a same type of pattern as the data recording tracks T, T, . . . ) are formed so that a length along the direction of travel is 30 μm, for example, with these areas being formed so that in a state where the nonmagnetic body 16 has been embedded, an average height H5 is approximately equal to the average height H1 of the data track area A1. In this case, by forming the fly height adjusting area Ax using the convex/concave pattern P5 of the same type as the convex/concave pattern P1 of the data track area A1, compared to a case where the average height H5 of the fly height adjusting area Ax is made approximately equal to the average height H1 of the data track area A1 using a convex/concave pattern of a different type to the convex/concave pattern P1, the average height can be easily and reliably set approximately equal.

When manufacturing this magnetic disk 1, the base layer 12 whose thickness is around 30 to 200 nm, the soft magnetic layer 13 whose thickness is around 50 to 300 nm, the oriented layer 14 whose thickness is around 3 to 30 nm, a ferromagnetic body layer whose thickness is around 10 to 30 nm, a first mask layer whose thickness is around 10 to 50 nm, a second mask layer whose thickness is around 10 to 30 nm, and a third mask layer whose thickness is around 30 to 300 nm are formed in that order by sputtering on the glass substrate 11, whose surface has been subjected to mirror surfacing, to fabricate a precursor (not shown) for manufacturing a magnetic disk. In this case, as one example, a Co (cobalt) alloy is used as the ferromagnetic body layer. Next, various types of convex/concave patterns that are used to form the convex/concave patterns P1 to P5 are transferred to the third mask layer of the precursor by nano-imprinting. Next, the precursor for which the transferring has been completed is set inside a vacuum chamber and the third mask layer is subjected to plasma processing by a plasma processing apparatus until the second mask layer is exposed from bottom surfaces of concaves in the convex/concave patterns.

Next, the second mask layer exposed from the bottom surfaces of the concaves is removed using an ion beam etching apparatus to expose the first mask layer, and then the exposed first mask layer is removed by a reactive ion etching apparatus. Next, the ferromagnetic body layer exposed from the bottom surfaces of the concaves is removed by a reactive ion etching apparatus to form the convex/concave patterns P1 to P5 on the multilayer structure 2, and then the first mask layer remaining on the convex/concave patterns P1 to P5 is removed by a reactive ion etching apparatus. After this, foreign matter adhering to the surfaces of the convex/concave patterns P1 to P5 is removed by a dry process washing means. By doing so, the machining of the precursor is completed. Next, the nonmagnetic body 16 is formed as a layer so as to cover the convex/concave patterns P1 to P5 by bias sputtering. In this case, as one example, the nonmagnetic body 16 is formed using $SiO_2$ (sulfur dioxide). Next, the nonmagnetic body 16 is etched by ion beam etching until surfaces of the convexes in the convex/concave pattern P1 (surfaces of the ferromagnetic body 15 in the data track area A1) are exposed.

In this case, the nonmagnetic body 16 is more easily etched for the convex/concave patterns P2, P3 whose formation pitch is larger (i.e., the concaves are wider) than the convex/concave pattern P1, so that the height of the surfaces of the nonmagnetic body 16 inside the concaves becomes lower than the height of the surfaces of the convexes (the surfaces of the ferromagnetic body 15). Accordingly, as shown in FIG. 3, the average height H2 of the preamble area Ap and the average height H3 of the address area Aa both become lower than the average height H1 of the data track area A1. On the other hand, for the convex/concave patterns P4a to P4d whose formation pitches are smaller (i.e., the concaves are narrower) than the convex/concave pattern P1, the nonmagnetic body 16 is difficult to etch, so that the nonmagnetic body 16 remains so as to cover the convexes. Accordingly, the average height H4 of the burst area Ab is higher than the average height H1 of the data track area A1. In the convex/concave pattern P5 constructed with the same type of pattern as the convex/concave pattern P1, in the same way as the data track area A1, the height of the surfaces of the nonmagnetic body 16 in the concaves becomes substantially equal to the height of the surfaces of the convexes (the surfaces of the ferromagnetic body 15). Accordingly, the average height H5 of the fly height adjusting area Ax is substantially equal to the average height H1 of the data track area A1. After this, a protective layer and a lubricating layer are formed so as to cover the ferromagnetic body 15, thereby completing the fabrication of the magnetic disk 1.

With the magnetic disk 1, as described above, a fly height adjusting area Ax is formed between the preamble area Ap and the address area Aa and a fly height adjusting area Ax is formed between the address area Aa and the burst area Ab. Accordingly, when the recording and reproduction of recording data are carried out for the magnetic disk 1, since the average heights H2, H3 are lower than the average height H1 of the data track area A1, even in the preamble area Ap and the address area Aa where the fly height of the head slider is reduced, the head slider slightly floats upward when passing the fly height adjusting areas Ax. This means that compared to a magnetic disk on which fly height adjusting areas Ax are not formed, there is a reduction in the effective fluctuation in the fly height of a head slider that passes (travels over) the data track area A1, the preamble area Ap, the fly height adjusting area Ax, and the address area Aa in that order.

The present inventors fabricated various types of samples, where the fly height adjusting area Ax is formed inside a servo pattern area A3 in which the same type of convex/concave pattern as the address area Aa is formed, measured the fluctuation in fly height, and verified the fluctuation in fly height due to differences relating to the presence or absence of the fly height adjusting area Ax and the length of the fly height adjusting area Ax. More specifically, as shown in FIGS. 4 to 8, a sample where no fly height adjusting area Ax is formed inside the servo pattern area A3 (see FIG. 4), a sample where a fly height adjusting area Ax whose length along the direction of travel of the head slider is around 30 μm is formed inside the servo pattern area A3 (see FIG. 5), a sample where a fly height adjusting area Ax whose length along the direction of travel of the head slider is around 60 μm is formed inside the servo pattern area A3 (see FIG. 6), a sample where a fly height adjusting area Ax whose length along the direction of travel of the head slider is around 90 μm is formed inside the servo pattern area A3 (see FIG. 7), and a sample where two fly height adjusting areas Ax whose respective lengths along the direction of travel of the head slider are around 30 μm are formed inside the servo pattern area A3 (see FIG. 8) were fabricated. Differences in the effective fluctuation in the fly height of the head slider, due to the presence or absence of the fly height adjusting area Ax and to differences in the area ratio occupied within the servo pattern area A3, were measured. It should be noted that for the five samples described above, the respective areas were formed so that the difference Ha in height between (i) the data track area A1 and the fly height adjusting area Ax and (ii) the address area Aa is around 10 nm, for example.

Figure 4:
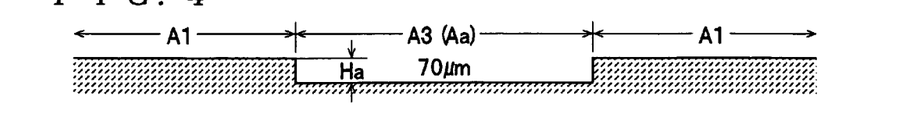
FIG. 4 is a cross-sectional view of a sample (a conventional magnetic disk) on which a fly height adjusting area is not formed inside the servo pattern area.
Figure 5:
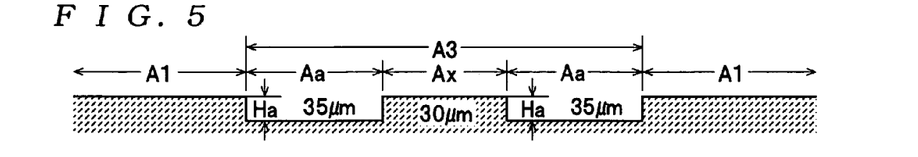
FIG. 5 is a cross-sectional view of a sample on which a fly height adjusting area, with a length of 30 μm and a height difference with the address area of around 10 nm, is formed inside the servo pattern area.
Figure 6:
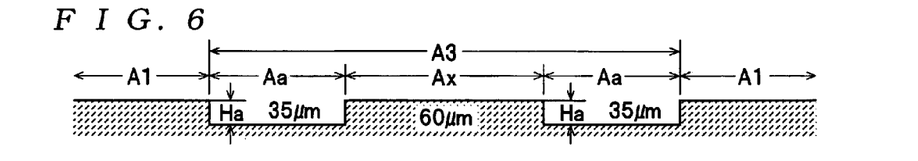
FIG. 6 is a cross-sectional view of a sample on which a fly height adjusting area, with a length of 60 μm and a height difference with the address area of around 10 nm, is formed inside the servo pattern area.
Figure 7:
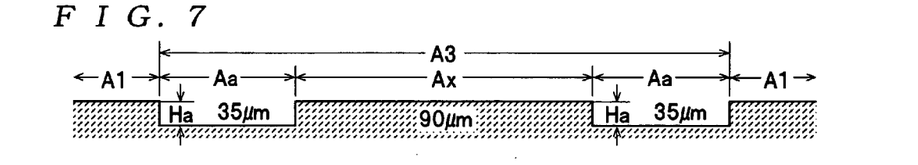
FIG. 7 is a cross-sectional view of a sample on which a fly height adjusting area, with a length of 90 μm and a height difference with the address area of around 10 nm, is formed inside the servo pattern area.
Figure 8:
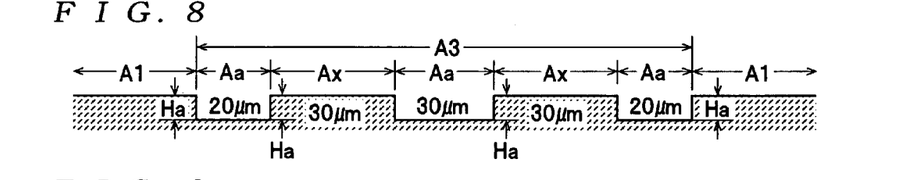
FIG. 8 is a cross-sectional view of a sample on which two fly height adjusting areas, with respective lengths of 30 μm and a height difference with the address area of around 10 nm, are formed inside the servo pattern area.

In this case, although the fluctuation in the fly height of the head slider was 3.5 nm for the sample shown in FIG. 4, the fluctuation in the fly height was 3.3 nm for the sample shown in FIG. 4. Accordingly, by forming the fly height adjusting area Ax in the servo pattern area A3, the fluctuation in the fly height of the head slider can be reduced by 0.2 nm. In the same way, for the samples shown in FIGS. 6 and 7, the respective fluctuations in the fly height were 1.8 nm and 1.5 nm. Accordingly, it can be understood that by increasing the area ratio the part of the servo pattern area A3 occupied by the fly height adjusting area Ax, it is possible to considerably reduce the fluctuation in the fly height of the head slider. In addition, as shown in FIG. 8, for a sample where the address area Aa is divided into three and two fly height adjusting areas Ax are formed in between, the fluctuation in the fly height resembles the sample shown in FIG. 6 and was 2.1 nm. Accordingly, even if a plurality of fly height adjusting areas Ax are formed, by setting the area ratio occupied by the fly height adjusting areas Ax within the servo pattern area A3 at approximately the same level, it is possible to reduce the fluctuation in the fly height of the head slider by approximately the same amount.

Figure 9:
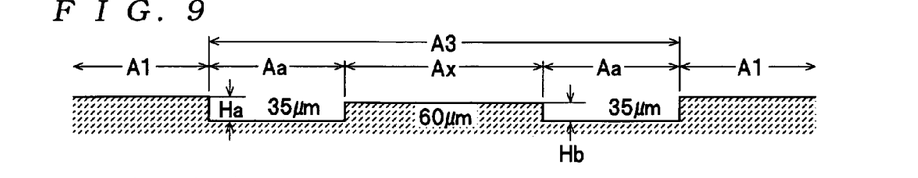
FIG. 9 is a cross-sectional view of a sample on which a fly height adjusting area, with a length of 60 μm and a height difference with the address area of around 9.0 nm, is formed inside the servo pattern area.
Figure 10:
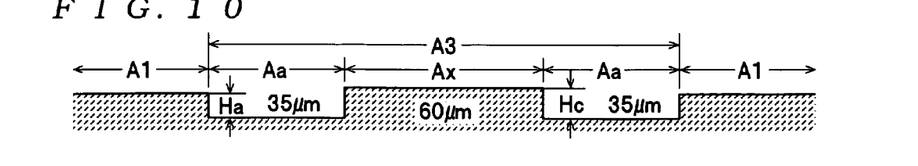
FIG. 10 is a cross-sectional view of a sample on which a fly height adjusting area, with a length of 60 μm and a height difference with the address area of around 11.0 nm, is formed inside the servo pattern area.

On the other hand, as shown in FIGS. 9 and 10, a sample where a fly height adjusting area Ax whose length along the distance of travel of the head slider is around 60 μm and whose height difference Hb with the address area Aa is around 9.0 nm is formed and a sample where a fly height adjusting area Ax whose length along the distance of travel of the head slider is around 60 μm and whose height difference Hc with the address area Aa is around 11.0 nm is formed were fabricated and the effective difference in the fluctuation in the fly height of the head slider due to the difference in the average height of the fly height adjusting area Ax was measured. Here, as described above, although the fluctuation in the fly height for the sample shown in FIG. 4 was 3.5 nm, the fluctuation in the fly height for the sample shown in FIG. 9 was 2.0 nm and the fluctuation in the fly height for the sample shown in FIG. 10 was 2.1 nm. Accordingly, even with a construction where the average height differs to the average height H1 of the data track area A1, it is still possible to considerably reduce the fluctuation in the fly height of the head slider. It should be noted that as described above, the present inventors confirmed that the fluctuation in the fly height of the head slider can be sufficiently reduced by forming the fly height adjusting area Ax so that the height difference with respect to the average height H1 of the data track area A1 is within a range of ±10% (that is, a "substantially equal range" for the present invention).

In this way, according to the magnetic disk 1, by forming the fly height adjusting area Ax within the servo pattern area A2, compared to a magnetic disk where the fly height adjusting area Ax is not formed, it is possible to considerably reduce the effective fluctuation in the fly height of the head slider that is made to pass (travel over) the data track area A1, the servo pattern area A2, and the data track area A1 in that order. In this way, when recording and reproducing data on the magnetic disk 1, a situation where the head slider contacts the surface of the magnetic disk 1 can be avoided. In this case, by forming a fly height adjusting areas Ax between the preamble area Ap and the address area Aa and between the address area Aa and the burst area Ab, respectively, it is possible to form the fly height adjusting area Ax without dividing the respective first functional areas (in this example, the preamble area Ap, the address area Aa, and the burst area Ab) into a plurality of parts. Accordingly, since it is possible to use, as the convex/concave patterns P2, P3, and P4 that compose the respective first functional areas, the same types of patterns as the convex/concave patterns corresponding to a normal servo pattern area, there is no need to change the types of patterns in order for the fly height adjusting area Ax to be formed. As a result, tracking servo control can be carried out without any special servo signal detection function being necessary.

Figure 11:
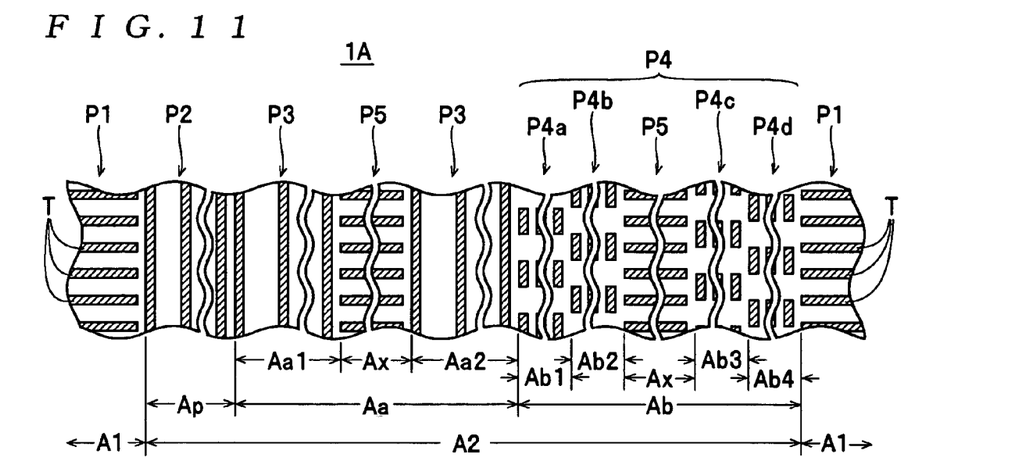
FIG. 11 is a pattern diagram showing example patterns of respective areas on the magnetic disk.
Figure 12:
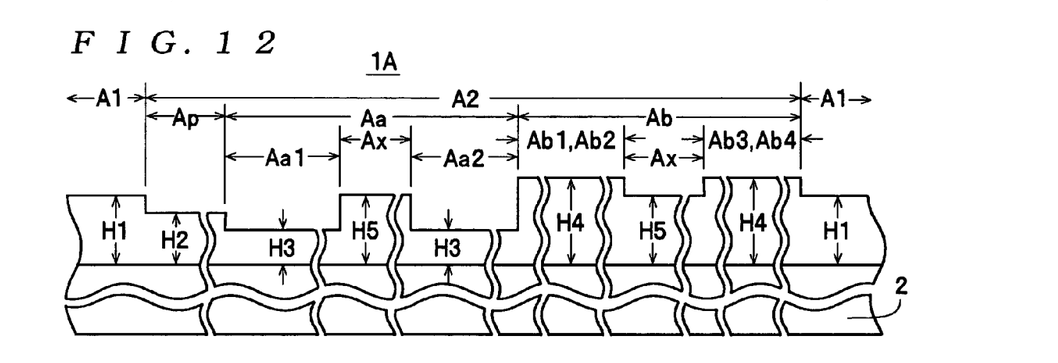
FIG. 12 is a cross-sectional view showing average heights of the respective areas on the magnetic disk.

It should be noted that the present invention is not limited to the construction described above. For example, although an example where the fly height adjusting area Ax is formed between the respective first functional areas inside the servo pattern area A2 has been described, the formation position of the fly height adjusting area Ax is not limited to the example described above. For example, in the same way as a magnetic disk 1A shown in FIGS. 11 and 12, it is possible to use a construction (a construction where a second functional area is formed within the first functional area) where a fly height adjusting area Ax, whose average height H5 is substantially equal to the average height H1 of the data track area A1, is formed between a first address area Aa1 and a second address area Aa2 produced by dividing the address area Aa into two, and another fly height adjusting area Ax is formed between a second burst area Ab2 and a third burst area Ab3 of the burst area Ab. With this construction, in the address area Aa with the reduced average height H3, the head slider floats by a slight amount when passing the fly height adjusting area Ax. This means that compared to a magnetic disk where a fly height adjusting area Ax is not formed in the address area Aa, it is possible to reduce the effective fluctuation in the fly height of the head slider as the head slider passes (travels over) the data track area A1, the first address area Aa1, the fly height adjusting area Ax, and the second address area Aa2 in that order. Also, with this construction, in the burst area Ab whose average height H4 is increased, the head slider slightly falls when passing the fly height adjusting area Ax. This means that compared to a magnetic disk without a fly height adjusting area Ax formed in the burst area Ab, it is possible to reduce the effective fluctuation in the fly height of a head slider that is made to pass (travel over) the first burst area Ab1, the second burst area Ab2, the fly height adjusting area Ax, the third burst area Ab3, the fourth burst area Ab4, and the data track area A1 in that order.

Figure 13:
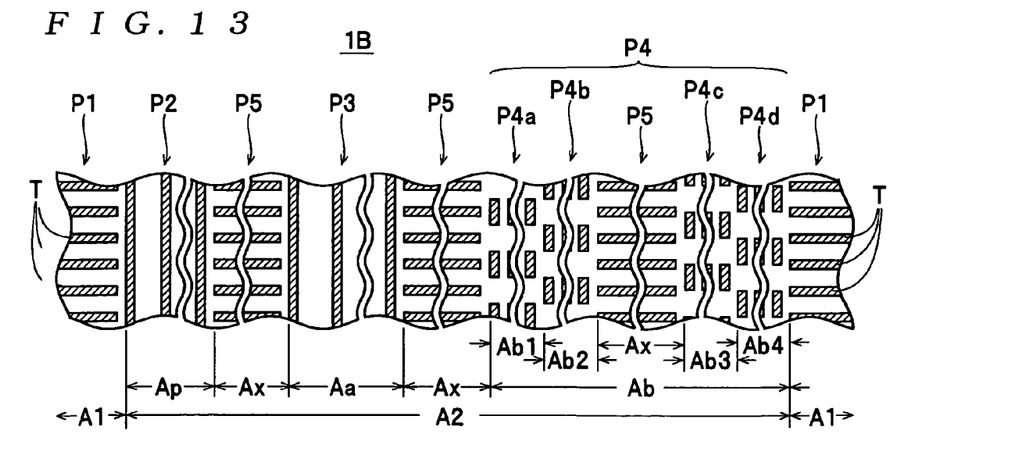
FIG. 13 is a pattern diagram showing example patterns of respective areas on the magnetic disk.

Also, like the magnetic disk 1B shown in FIG. 13, it is possible to use a construction where a fly height adjusting area Ax is formed between the preamble area Ap and the address area Aa and another fly height adjusting area Ax is formed between the second burst area Ab2 and the third burst area Ab3 in the burst area Ab (a construction where second functional areas are formed both between first functional areas and within first functional areas). In this construction also, like the magnetic disks 1, 1A, the fluctuation in the fly height of the head slider can be sufficiently reduced. Also, in the example described above, the fly height adjusting area Ax is constructed by forming a convex/concave pattern P5 of the same type as the convex/concave pattern P1 of the data track area A1 (that is, a convex/concave pattern with the same type of pattern as the data recording tracks T, T, . . . ), but the convex/concave pattern for forming the second functional area for the present invention is not limited to this. As one example, so long as the average height of the second functional area is substantially equal to the average height H1 of the data track area A1, the second functional area may be formed by forming a convex/concave pattern of a different type to the convex/concave pattern P1 of the data track area A1.

It is also possible to use a construction where various kinds of recording data can be recorded in the convex/concave pattern that composes the fly height adjusting area Ax, or a construction where various signals that differ to the control signals are recorded in advance using the convex/concave pattern for the fly height adjusting area Ax. In addition, the lengths and magnitudes, formation pitches, and the like of the respective areas described above can be freely set as desired. In this case, when less than 10% of the length of the second functional area is occupied by the length of the servo pattern area, it is difficult to reduce the fluctuation in the fly height of the head slider. On the other hand, when more than 65% of the length of the servo pattern area is occupied by the length of the second functional area, the data track area is narrowed and the recording capacity of the magnetic recording medium is reduced. Accordingly, the length of the second functional area should preferably be in a range of 10% to 65% inclusive. In addition, in the various examples (the magnetic disks 1, 1A, 1B) described above, the average heights H2, H3 of the preamble area Ap and the address area Aa are lower than the average height H1 of the data track area A1, and the average height H4 of the burst area Ab is higher than the average height H1, but as one example, the present invention may also be applied to a magnetic disk where the average heights of the preamble area and the address area are higher than the average height of the data track area and the average height of the burst area is lower than the average height of the data track area.

What is claimed is:

1. A magnetic recording medium, on which a data track area and a servo pattern area are formed by embedding a nonmagnetic material inside concaves in a plurality of types of convex/concave patterns formed of a magnetic material on a substrate,
    wherein the servo pattern area comprises:
    a plurality of types of first functional areas in which control signals for disk access are recorded during manufacturing using the convex/concave patterns; and
    a second functional area, in which a convex/concave pattern of a different type to the convex/concave patterns of the respective first functional areas is formed and in which the nonmagnetic material is embedded so that an average height within the second functional area is substantially equal to an average height in the data track area, the control signals being unrecorded in the second functional area and including a preamble signal, an address signal and a burst signal.

2. A magnetic recording medium according to claim 1, wherein in the servo pattern area, the second functional area is formed between adjacent first functional areas.

3. A magnetic recording medium according to claim 1, wherein in the second functional area, a convex/concave pattern of a same type as the convex/concave pattern formed in the data track area is formed and the nonmagnetic material is embedded in the convex/concave pattern in the second functional area.

4. A magnetic recording medium, on which a data track area and a servo pattern area are formed by embedding a nonmagnetic material inside concaves in a plurality of types of convex/concave patterns formed of a magnetic material on a substrate, wherein the servo pattern area comprises:
    a plurality of types of first functional areas in which control signals for disk access are recorded during manufacturing using the convex/concave patterns; and
    a second functional area, in which a convex/concave pattern of a different type to the convex/concave patterns of the respective first functional areas is formed and in which the nonmagnetic material is embedded so that an average height within the second functional area is substantially equal to an average height in the data track area, and
    wherein every functional area in which the control signals are recorded is the first functional areas, the control signals including a preamble signal, an address signal and a burst signal.

5. The magnetic recording medium according to claim 4, wherein in the servo pattern area, the second functional area is formed between adjacent first functional areas.

6. The magnetic recording medium according to claim 4, wherein in the second functional area, a convex/concave pattern of a same type as the convex/concave pattern formed in the data track area is formed and the nonmagnetic material is embedded in the convex/concave pattern in the second functional area.

7. A magnetic recording medium, on which a data track area and a servo pattern area are formed by embedding a nonmagnetic material inside concaves in a plurality of types of convex/concave patterns formed of a magnetic material on a substrate, wherein the servo pattern area comprises:
   a plurality of types of first functional areas in which control signals for disk access are recorded during manufacturing using the convex/concave patterns; and
   a second functional area, in which a convex/concave pattern of a different type to the convex/concave patterns of the respective first functional areas is formed and in which the nonmagnetic material is embedded so that an average height within the second functional area is substantially equal to an average height in the data track area, wherein a convex/concave pattern of a same type as the convex/concave pattern formed in the data track area is formed in the second functional area.

* * * * *